United States Patent Office 2,731,462
Patented Jan. 17, 1956

2,731,462

BASIC KETONES AND A PROCESS OF PREPARING THEM

Gustav Ehrhart, Frankfurt am Main Hochst, and Walter Bestian, Frankfurt am Main Zeilsheim, Germany, assignors to Farbwerke Hoechst Aktiengesellschaft vormals Meister Lucius und Bruning, Frankfurt am Main Hochst, Germany, a German company No Drawing. Application January 30, 1952,
Serial No. 269,116

Claims priority, application Germany February 8, 1951

1 Claim. (Cl. 260—247.1)

The present invention relates to basic ketones and to a process of preparing them.

In French patent specification No. 884,740 basic ketones have been described which are derived from diphenyl methane and possess an excellent analgesic action.

Now we have found that new compounds having a valuable analgesic efficacy are obtained by reacting carboxylic acid esters of the formula

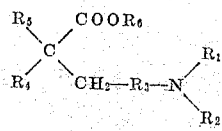

wherein $R_1$ and $R_2$ stand for lower alkyl radicals, such as methyl, ethyl, propyl or isopropyl, and together stand for a four to five membered divalent radical, $R_3$ stands for the methylene group or for a methylene group substituted by lower alkyl radicals, $R_4$ stands for the pyridine, thiazol and pyrimidine radicals a nuclear carbon-atom of which is directly connected with the central carbon-atom, $R_5$ stands for the phenyl- or alkoxyphenyl radical and $R_6$ likewise means a lower alkyl radical, with alkyl magnesium compounds. Ketones of the formula

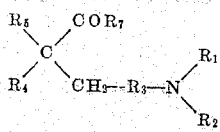

wherein $R_1$, $R_2$, $R_3$, $R_4$, $R_5$ have the meanings given above and $R_7$ means lower alkyl, are thus obtained.

The basically substituted carboxylic acid esters to be used for the reaction with alkyl magnesium halides can be obtained by reacting carboxylic acid esters of the general formula

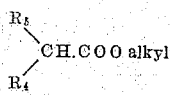

wherein $R_4$ and $R_5$ have the meanings given above, with basically substituted alkyl halides in the presence of agents capable of splitting off hydrogen halide. Halides of this kind are, for example, N-beta-chlorethyl-dimethyl-amine, N-beta-chlorethyl-di-ethyl-amine, 1-chloro-2-dimethyl-amino-propane, N-beta-chlorethyl-piperidine, N-beta-chlorethyl-pyrrolidine and N-betachlorethyl-morpholine.

As reaction components for the reaction with the basically substituted alkyl halides the following carboxylic acid esters may, for example, be used: phenyl-pyridyl-(2)-acetic acid ethyl ester, phenyl-pyridyl-(4)-acetic acid ethyl ester, methoxyphenyl-pyridyl-acetic acid ethyl ester, ethoxy-phenyl-pyridyl-acetic acid ethyl ester, phenyl-thiazolyl-acetic acid ethyl ester, alkoxyphenyl-thiazolyl-acetic acid ethyl ester, phenyl-pyrimidyl-2-acetic acid ethyl ester. Instead of the ethyl esters, the methyl esters or other alkyl esters of the aforenamed groups or analogous compounds may be used. The isopropyl ester is particularly useful, for frequently better yields are attained therewith than with, for example, the methyl ester. The same holds true with regard to other ramified esters.

The reaction products of the carboxylic acid esters described with the basically substituted alkyl halides are reacted, according to the present invention, with alkyl magnesium halides. For the reaction alkyl magnesium halides are used which generally come into consideration for reactions of that kind, preferably ethyl magnesium bromide. Other alkyl magnesium halides, especially those with low alkyl radical, may also be used.

The reaction of the basically substituted carboxylic acid esters with the alkyl magnesium halides takes place in general with very good yields. This is surprising insofar as in many cases it is impossible to stop the reaction of esters according to Grignard in the ketone stage. Moreover, it may be pointed out that it is not possible readily to obtain the aforenamed ketones from the corresponding nitriles and alkyl magnesium halides because the nitrile group is already split off under the usual conditions of a Grignard reaction with substitution of hydrogen.

The amino ketones formed can, in most cases, be distilled without any difficulties; they are obtained in the form of oily bodies. The salts, which may be prepared in the usual manner, are in many cases, crystalline and the melting points thereof may be employed for identification of the new substances obtained. Above all the succinic acid salts or the maleic acid salts may be used for that purpose, because they are not hygroscopic.

The new amino ketones and the salts thereof, for example the salts with inorganic acids, such as sulfuric acid, hydrochloric acid or phosphoric acid, or with organic acids, such as acetic acid, propionic acid or, benzoic acid, or with sulfonic acids, such as ethanol-sulfonic acid possess a high analgesic efficiency and at the same time in general a lower toxicity than the diphenyl-amino-ketones which have a similar constitution. Especially the morpholine derivatives behave very favorably in view of their small detrimental effect on the circulation. The thiazolyl compounds, too, show only a small toxicity. The compounds may also be used as remedies; moreover, they may likewise serve as intermediate products for the preparation of other organic compounds.

The following examples serve to illustrate the invention, but they are not intended to limit it thereto, the parts being by weight unless otherwise stated and the relationship of parts by weight to parts by volume being the same as that of the gram to the cubic centimetre:

Example 1

24.1 parts of phenyl-pyridyl-(2)-acetic acid ethyl ester, 14.2 parts of N-beta-chlorethylpyrrolidine and 4.4 parts of sodium amide are stirred in 150 parts of toluene at a temperature between 35° C. and 40° C., during which operation the temperature remains steady due to the heat effect of the reaction. The mixture is then boiled for 3 hours under reflux and water is added after cooling, the toluene solution is separated and shaken out with the excess of dilute acetic acid. The extract is rendered alkaline and the red oil which has separated is isolated by shaking with ether. During the distillation the alpha-phenyl - alpha - pyridyl-(2)-gamma-N-pyrrolidino-butyric acid ethyl ester passes over in the form of a highly viscous, deeply dark red oil boiling at a temperature between 171° C. and 174° C. under a pressure of 1 mm. (The dipicrate melts at 146° C.–147° C.). 10.25 parts of the basic ester thus obtained are dissolved in 50 parts of benzene and the solution formed is added, drop by drop, to a Grignard solution prepared from 8.4 parts of ethyl-bromide, 1.82 parts of magnesium chips and 50 parts of ether. While the ether evaporates, the temperature is slowly increased to 70° C.–80° C. and the solution is stirred at this temperature for one hour. After cooling it is decomposed with dilute hydrochloric acid, again rendered alkaline with ammonia and the benzene solution is separated.

During the distillation the 1-N-pyrrolidino-3-phenyl-3-pyridyl-(2')-hexanone-(4) boiling at a temperature between 165° C. and 170° C. under a pressure of 0.15 mm. passes over in a very good yield as a highly viscous red oil.

The succinate crystallizes from ethyl acetate in colorless needles which melt at 144° C.–146° C.

The base corresponds to the formula:

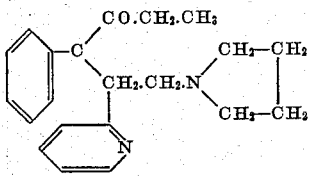

Example 2

69 parts of phenyl-pyridyl-(2)-acetic acid ethyl ester, 34 parts of beta-chlorethyldimethylamine and 12.5 parts of sodium amide are stirred for one hour at a temperature of 35° C.–40° C. in 350 parts of toluene—as described in Example 1—and the mixture is then boiled for one hour at 110° C. for the completion of the reaction. Water is added to the mixture, the toluene solution is shaken out with the excess of dilute acetic acid and the extract is rendered alkaline with ammonia. The oil which has separated is removed and distilled.

The alpha-phenyl-alpha-pyridyl-(2)-gamma-dimethylamino-butyric acid ethyl ester boiling at a temperature between 181° C. and 184° C. under a pressure of 3 mm. is obtained in a yield of 75 per cent. The dipicrate melts at 168° C.–169° C.

A benzene solution of 15.6 parts of the ester thus obtained is added, drop by drop, to a Grignard solution prepared from 21.8 parts of ethyl bromide, 4.6 parts of magnesium chips and 150 parts of ether. The temperature is slowly raised to 60° C., while simultaneously evaporating the ether. After one hour the mixture is cooled and decomposed with dilute hydrochloric acid. After the addition of ammonia, the benzene solution is separated and the aminoketone is distilled.

The 1 - dimethylamino - 3-phenyl-3-pyridyl-(2')-hexanone-(4) boils at a temperature between 151° C. and 155° C. under a pressure of 0.4 mm. The yield is nearly quantitative.

The succinate crystallizes from ethyl acetate and acetone in colorless small needles which melt at 118° C.–119° C. The maleinate crystallizes from ethyl acetate in bright laminae which melt at 142° C.–143° C.

The base corresponds to the formula:

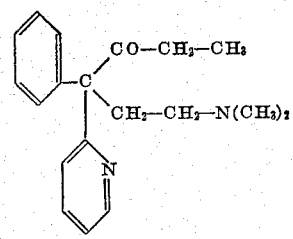

Example 3

63.1 parts of phenyl-pyridyl-(2)-acetic acid ethyl ester are stirred for one hour at a temperature between 35° C. and 40° C. in 200 parts of toluene together with 36 parts of N-beta-chlorethyl-morpholine and 9.5 parts of sodium amide and stirring is continued for further 3 hours at 110° C. The mixture is then worked up as described in the previous examples. The alpha-phenyl-alpha-pyridyl-(2)-gamma-N-morpholino-butyric acid ethyl ester boiling at a temperature between 190° C. and 193° C. under a pressure of 0.3 mm. is obtained in a yield of 50–60 per cent in the form of a highly viscous red oil.

A Grignard solution prepared from 4.05 parts of magnesium chips, 19.1 parts of ethyl bromide and 100 parts of ether is reacted, as described in the previous examples, with 25 parts of the ester thus obtained in 200 parts of benzene and the aminoketone formed is isolated in the usual manner.

The 1-N-morpholino-3-phenyl-3-pyridyl-(2')-hexanone-(4) is a red, highly viscous oil which boils at a temperature between 185° C. and 189° C. under a pressure of 0.5 mm.

The maleinate crystallizes from ethyl acetate in colorless needles which melt at 132° C.–133° C.

The base corresponds to the formula:

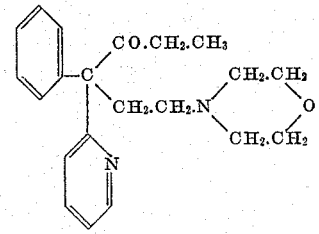

The reaction of the phenyl-pyridyl-(2)-acetic acid isopropyl ester may be carried through in a manner analogous to that described above, improved yields, being, however, obtained.

355 parts of phenyl-pyridyl-(2)-acetic acid isopropyl ester (melting at 52° C.–53° C.) are reacted, as described above, with 218 parts of beta-chlorethyl-morpholine. After the further treatment, 375 parts of alpha-phenyl-alphapyridyl-(2)-gamma-N-morpholino-butyric acid isopropyl ester are obtained besides 2-benzyl-pyridine. During the reaction of this ester with ethyl-magnesium-bromide the 1 - N-morpholino-3-phenyl-3-pyridyl-(2')-hexanone-(4) already described is obtained in a very good yield.

Example 4

51 parts of phenyl-pyridyl-(2)-acetic acid ethyl ester are reacted as usual with 9.1 parts of sodium amide and 27 parts of 2-dimethyl-amino-propyl chloride in 200 parts of toluene and the reaction product is boiled for 2 hours under reflux. After working up the mixture of isomers of alpha-phenyl-alpha-pyridyl-(2)-gamma-dimethylamino valeric acid ethyl ester and alpha-phenyl-alpha-pyridyl-(2)-beta-methyl-gamma-dimethylamino-butyric acid ethyl ester boiling at a temperature between 160° C. and 163° C. under a pressure of 0.8 mm. is obtained in a good yield.

29.5 parts of the basic ester thus obtained are dissolved in 150 parts of benzene and the solution is added, drop by drop, to a Grignard solution which is prepared from 6 parts of magnesium chips, 27.5 parts of ethyl-bromide and 100 parts of ether. The mixture is heated for 2 hours to 60° C. and worked up as described in the previous examples.

The mixture of isomers of the two ketones formed, the 2 - dimethylamino-4-phenyl-4-pyridyl-(2')-heptanone-(5) and the 1-dimethylamino-2-methyl-3-phenyl-3-pyridyl-(2')-hexanone-(4), is obtained during the distillation as a viscous red oil boiling at a temperature between 164° C. and 166° C. under a pressure of 0.8 mm.

During the reaction of the maleinates in ethyl acetate only the maleinate of the 2-dimethylamino-4-phenyl-4-pyridyl-(2')-heptanone-(5) is separated from the mixture of isomers after having been allowed to stand for a prolonged time. After being recrystallized for several times from ethyl acetate, the maleinate melts at 147° C.–148° C.

The base corresponds to the formula:

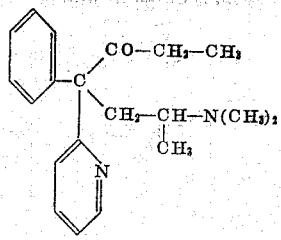

Example 5

45 parts of phenyl-pyridyl-(4)-acetic acid ethyl ester are boiled for 2 hours under reflux with 21.5 parts of beta-chlorethyldimethylamine in the presence of 8.6 parts of sodium amide and 200 parts of toluene. After the usual working up 30.2 parts of a red viscous oil are obtained boiling at a temperature between 168° C. and 178° C. under a pressure of 1 mm.

28.3 parts of the ester thus obtained are dissolved in 200 parts of benzene and the solution thus formed is added, drop by drop, to a Grignard solution which is prepared from 5 grams of magnesium chips, 23.4 parts of ethyl bromide and 200 parts of ether. The mixture is heated for one hour to 75° C.–80° C. and worked up as described in the previous examples.

During the distillation 22.5 parts of a red oil are obtained boiling at a temperature between 185° C. and 190° C. under a pressure of 3 mm.

The maleinate of the 1-dimethylamino-3-phenyl-3-pyridyl-(4')-hexanone-(4) crystallizes from ethyl acetate in the form of small needles which melt at 119° C.–120° C.

The base corresponds to the formula:

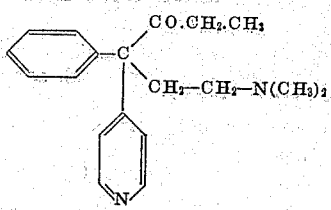

Example 6

14 parts of phenyl-thiazolyl-(2)-acetic acid ethyl ester are stirred for 30 minutes at 30° C.–35° C. and for 2 hours at 110° C. together with 5.5 parts of beta-chlorethyldimethylamine in the presence of 2 parts of sodium amide and 100 parts of toluene. After the addition of water, the layer of toluene is shaken out with an excess of dilute acetic acid and the extract is rendered alkaline. The oil which has separated is taken up in ether, the solution is dried and evaporated. 10.85 parts of a red viscous oil are obtained.

10.65 parts of the ester thus formed are dissolved in 75 parts of benzene and the solution is added, drop by drop, to a Grignard solution, which is prepared from 2 parts of magnesium chips, 9.5 parts of ethyl bromide and 50 parts of ether and the solution is heated for 1½ hours to 60° C.

The solution is then worked up in the usual manner and 8.1 parts of a yellow oil are obtained which boils at a temperature between 145° C. and 150° C. under a pressure of 0.3 mm.

The maleinate of 1-dimethylamino-3-phenyl-3-thiazolyl-(2')-hexanone-(4) crystallizes from ethyl acetate in colorless bright laminae which melt at 127° C.–128.5° C.

The base corresponds to the formula:

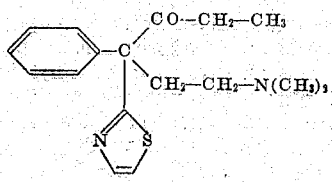

Example 7

The mixture of 46.6 parts of phenyl-thiazolyl-(2)-acetic acid methyl ester, 29.7 parts of N-beta-chlorethyl-pyrrolidine, 8.5 parts of sodium amide and 175 parts of toluene is stirred for 1 hour at 35° C.–40° C. and then boiled for 4 hours under reflux. After cooling, 150 parts of water are added, the toluene solution is separated and extracted with an excess of dilute acetic acid. (During the evaporation of the toluene solution which has been extracted 7 grams of 2-benzylthiazole are obtained.) The aqueous extract is rendered alkaline with a sodium hydroxide solution, the oil which has separated is taken up in ether and the solution is evaporated. The residue is a red oil which represents the alpha-phenyl-alpha-thiazolyl - (2)-gamma-N-pyrrolidinobutyric-acid-methyl-ester. The yield amounts to 52.5 parts.

A solution of 48 parts of the above alpha-phenyl-alpha-thiazolyl - (2)-gamma-N-pyrrolidinobutyric-acid-methyl-ester, dissolved in 200 parts of benzene, is added, drop by drop, at 25° C.–35° C. to an organo-magnesium solution of 9 parts of magnesium, 42 parts of ethyl bromide and 200 parts of ether. The mixture is then stirred for one hour at 35° C. and finally heated for one hour to 60° C. After the decomposition with ammonium chloride solution, the solution of benzene and ether is separated and evaporated.

During the distillation there is obtained after small first runnings, the 1-N-pyrrolidino-3-phenyl-3-thiazolyl-(2')-hexanone-(4) as a highly viscous yellow oil boiling at a temperature between 180° C. and 185° C. under a pressure of 0.6 mm.

The succinate is sparingly soluble in ethyl acetate, ether and acetone. From a mixture of acetone and methanol (in a ratio of 10:1) the salt crystallizes in the form of small colorless needles which melt at 131.5° C.–133° C.

The base corresponds to the formula:

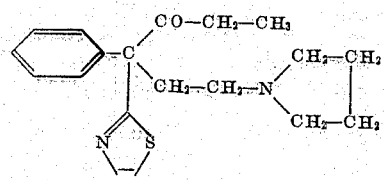

Example 8

A mixture prepared from 58.25 parts of phenylthiazolyl-(2)-acetic acid methyl ester, 41 parts of N-beta-chlorethyl-piperidine, 10.75 parts of sodium amide and 250 parts of toluene is stirred for one hour at 35° C.–40° C. and boiled for further 4 hours under reflux. The reaction product is worked up as described in the previous examples. 58.5 parts of the alpha-phenyl-alpha-thiazolyl-(2)-gamma-N-piperidino-butyric acid methyl ester are obtained besides 14.5 parts of 2-benzyl-thiazole.

58 parts of the above crude alpha-phenyl-alpha-thiazolyl-(2)-gamma-N-piperidino-butyric acid methyl ester, dissolved in 200 parts of benzene, are added, drop by drop, in the course of about 20 minutes at 25° C.–30° C. to an organomagnesium solution prepared from 10.2 parts of magnesium chips, 48 parts of ethyl bromide and 150 parts of ether. The mixture is then stirred for 1 hour at room-temperature and finally heated for one hour to 60° C. After the decomposition with an ammonium chloride solution, the solution of benzene and ether is separated, dried and evaporated.

The residue is a red oil boiling at a temperature between 190° C.–195° C. under a pressure of 1 mm. and crystallizing without an exact melting point, after having been allowed to stand for a prolonged time.

The succinate crystallizes from acetone and a small portion of methanol in the form of solid colorless prisms which melt at 121° C.–123° C.

The base corresponds to the formula:

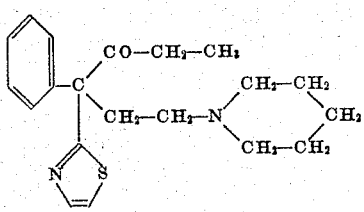

Example 9

A mixture of 93.2 parts of phenyl-thiazolyl-(2)-acetic acid methyl ester, 65 parts of N-beta-chlorethylmorpholine, 17.2 parts of sodium amide and 350 parts of toluene is stirred for one hour at 35° C.–40° C. and boiled for 4 hours under reflux. The mixture is worked up as described in the previous examples. 90.4 parts of alpha-phenyl-alpha-thiazolyl-(2)-gamma-N-morpholino-butyric acid methyl ester, a red highly viscous oil and 31 parts of 2-benzyl-thiazole are thus obtained.

The benzene solution of 90.4 parts of the above crude alpha-phenyl-alpha-thiazolyl-(2)-gamma-N-morpholino-butyric acid methyl ester, dissolved in 300 parts of benzene, is added, drop by drop, at 30° C.–35° C. to an organo-magnesium solution of 15.8 parts of magnesium chips, 76 parts of ethyl bromide and 250 parts of ether. A heat reaction and the separation of a yellow amorphous salt immediately set in. The mixture is stirred for 30 minutes at 35° C. and then heated for 2 hours to 60° C.–65° C. After cooling, the mixture is decomposed with an ammonium chloride solution, the organic solution is separated, dried, and evaporated and the residual highly viscous red oil is distilled. The 1-N-morpholino-3-phenyl-3-thiazolyl(2')-hexanone-(4) boiling at a temperature of 190° C. and 195° C. under a pressure of 0.6 mm. is obtained.

The succinate crystallizes from a mixture of acetone and ethyl acetate (in a ratio of 1:1) in colorless needles, which, on filtering with suction, creep on the filter, but soon become stable in air again and then melt at 112° C.–114° C.

The base corresponds of the formula:

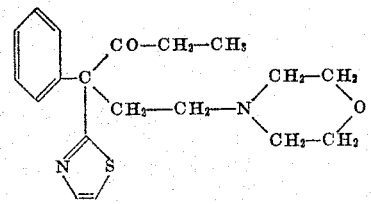

Example 10

69.9 parts of phenyl-thiazolyl-(2)-acetic acid methyl ester, 48 parts of beta-chlorethyl-diethylamine, 13.2 parts of sodium amide and 300 parts of toluene are stirred for one hour at 35° C. and then boiled for 3 hours under reflux. By the usual working up 84 parts of alpha-phenyl-alpha-thiazolyl-(2)-gamma-diethylamino butyric acid methyl ester are obtained.

This crude ester is dissolved in 200 parts of benzene without further purification and the solution obtained is added, drop by drop, to a Grignard solution prepared from 15 parts of magnesium chips, 68 parts of ethyl bromide and 200 parts of ether. The mixture is then heated for one hour to 50° C.–55° C. and, after cooling, decomposed with an ammonium chloride solution. The solution of benzene and ether is separated, dried and evaporated. During the distillation the 1-diethylamino-3-phenyl-3-thiazolyl-(2')-hexanone-(4) passes over as a viscous yellow oil boiling at a temperature between 170° C.–175° C. under a pressure of 0.6 mm.

The succinate crystallizes from acetone in colorless needles which melt at 97° C.–98° C.

The base corresponds to the formula:

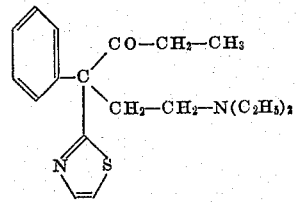

Example 11

51 parts of (3'-methoxy-phenyl)-thiazolyl-(2)-acetic acid methyl ester, 22 parts of dimethyl-amino-ethyl-chloride, 8.5 parts of sodium amide and 200 parts of toluene are boiled for 30 minutes at 35° C. and then boiled for 2 hours under reflux. The mixture is cooled, 200 parts of water are added to the reaction product and the toluene solution is separated. After having worked up this solution as described in the previous examples, 53 parts of the alpha-(3'-methoxy-phenyl)-alpha-thiazolyl-(2')-gamma-dimethylamino butyric acid methyl ester are obtained.

This crude ester is dissolved in 100 parts of benzene and the solution obtained is added, drop by drop, at 25° C.–30° C. to an organo-magnesium solution which is prepared from 7.7 parts of magnesium chips, 35 parts of ethyl bromide and 100 parts of ether. The mixture is reheated for one hour to 50° C–55° C. and then decomposed in the usual manner with an ammonium chloride solution. During the evaporation of the organic solution 48.5 parts of a red oil are obtained which constitute the 1-dimethylamino-3-(3'-methoxy-phenyl)-3-thiazolyl-(2')-hexanone-(4). The basic ketone is a yellow, highly viscous oil boiling at a temperature between 175° C. and 180° C. under a pressure of 0.6 mm.

The maleinate very readily crystallizes. It crystallizes from ethyl acetate in the form of small colorless needles which melt at 123° C.–125° C.

The base corresponds to the formula:

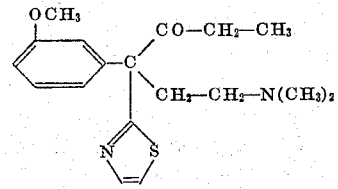

By boiling the product with hydrobromic acid of 48 per cent strength, the ether group can be blown up in the molecule whereby the 1-dimethylamino-3-(3'-hydroxy-phenyl)-3-thiazolyl-(2')-hexanone-(4) is formed. The product crystallizes from ethyl acetate in the form of colorless needles which melt at 113° C.–115° C.

Example 12

12.5 parts of phenyl-pyrimidyl-(2)-ethyl acetate (boiling at a temperature between 170° C. and 175° C. under a pressure of 2 mm.), 6.5 parts of dimethylamino-ethyl-chloride, 2.2 parts of sodium amide and 75 parts by volume of toluene are heated, while stirring, for 30 minutes to 75° C.–80° C. and then boiled for 3 hours under reflux. The mixture is decomposed with water, the toluene solution is thoroughly extracted with dilute acetic acid, the extract is rendered alkaline with sodium hydroxide solution and the oil which has separated is taken up in ether. After the evaporation of the ether 8.5 parts of a red oil are obtained.

8.5 parts of alpha-phenyl-alpha-pyrimidyl-(2)-butyric acid ethyl ester are added, drop by drop, without any further purification, to a Grignard solution prepared from 1 part of magnesium, 4 parts of ethyl bromide and 100 parts of ether. The mixture is boiled for 2 hours and decomposed with a solution of ammonium chloride. The ethereal solution is separated, dried and evaporated and the residue is distilled. The 1-dimethyl-amino-3- phenyl-3-pyrimidyl-(2')-hexanone-(4) passes over at a temperature between 155° C. and 160° C. under a pressure of 0.5 mm. in the form of a yellow viscous oil.

The base corresponds to the formula:

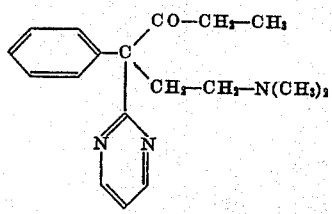

We claim:

The process which comprises reacting carboxylic acid esters of the formula

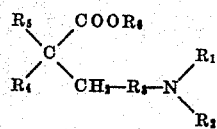

wherein $R_1$ and $R_2$ are members selected from the group consisting of lower alkyl radicals and further members wherein $R_1$ and $R_2$ taken together with —N< form piperidine, morpholine and pyrrolidine, $R_3$ stands for a member selected from the group consisting of $CH_2$ and $CH_2$ substituted by lower alkyl, $R_4$ stands for a member selected from the group consisting of pyridine, thiazol and pyrimidine radicals a nuclear carbon-atom of which is directly connected with the central carbon-atom, $R_5$ stands for a member selected from the group consisting of phenyl and alkoxyphenyl, $R_6$ means lower alkyl, with alkyl magnesium halides in a substantially anhydrous inert organic solvent and hydrolyzing the addition product so formed.

References Cited in the file of this patent

UNITED STATES PATENTS

| | | |
|---|---|---|
| 2,542,466 | Blicke | Feb. 20, 1951 |
| 2,585,550 | Hoffman et al. | Feb. 12, 1952 |
| 2,601,141 | Hoffman et al. | June 17, 1952 |
| 2,649,444 | Barrett | Aug. 18, 1953 |